(No Model.)
A. B. CLARK.
CORN PLANTER.
No. 267,151.
Patented Nov. 7, 1882.
2 Sheets—Sheet 1.
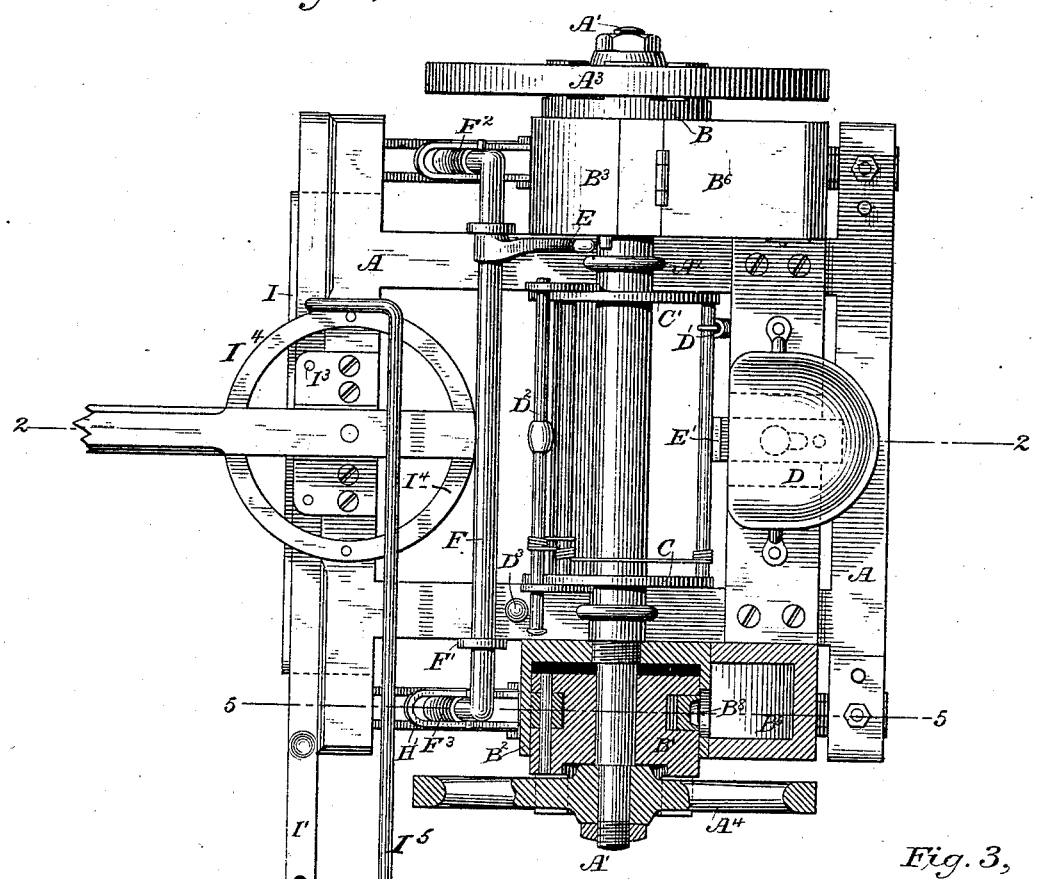
Fig. 1,
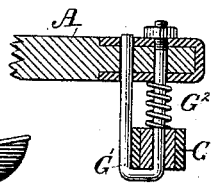
Fig. 3,
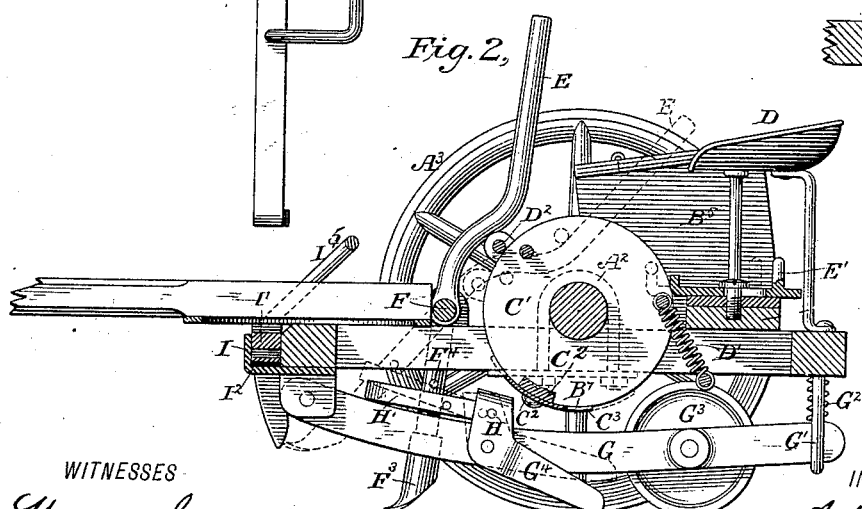
Fig. 2,
WITNESSES
Wm A. Skinkle
Geo W. Breck
INVENTOR
A. B. Clark
By his Attorneys
Holloway & Blanchard (No Model.) 2 Sheets—Sheet 2.
A. B. CLARK.
CORN PLANTER.
No. 267,151. Patented Nov. 7, 1882.
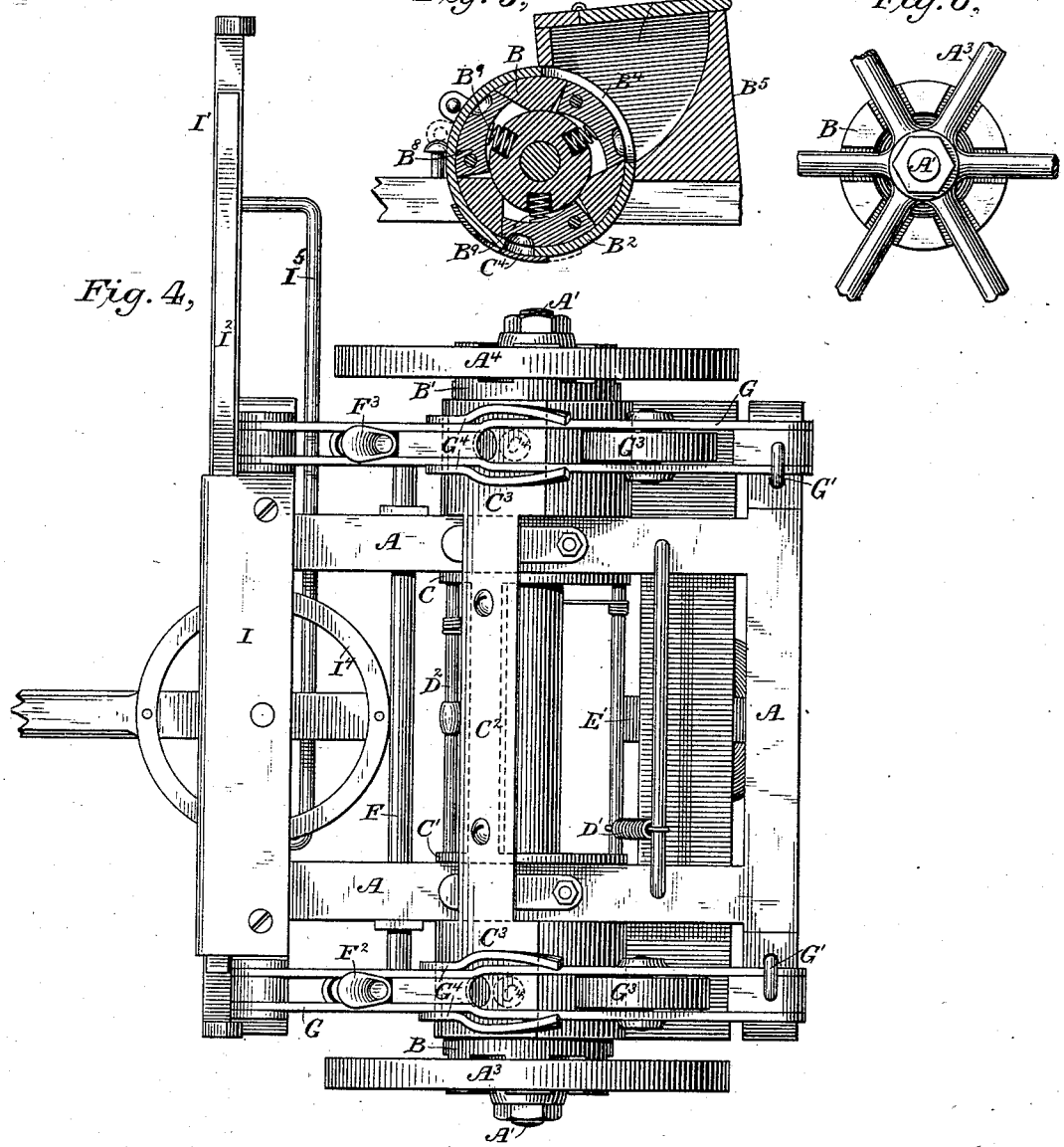
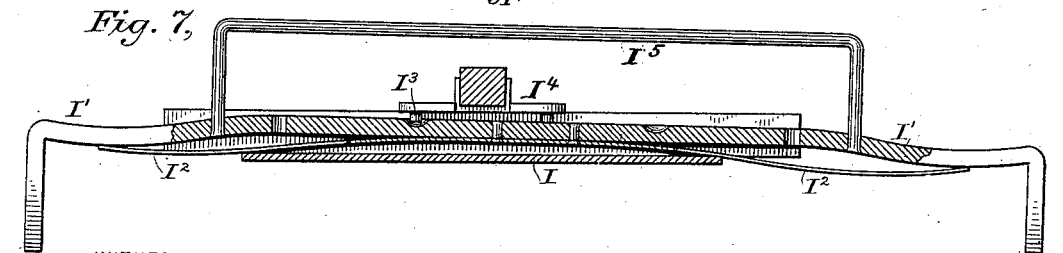
WITNESSES
Wm A. Skinkle
Geo. W. Breck
INVENTOR
A. B. Clark
By his Attorneys
Holloway & Blanchard

UNITED STATES PATENT OFFICE.

ALVIN B. CLARK, OF RICHMOND, INDIANA.

CORN-PLANTER.

SPECIFICATION forming part of Letters Patent No. 267,151, dated November 7, 1882.

Application filed January 14, 1882. (No model.)

*To all whom it may concern:*

Be it known that I, ALVIN B. CLARK, a citizen of the United States, residing at Richmond, in the county of Wayne and State of Indiana, have invented certain new and useful Improvements in Corn-Planters, of which the following is a specification, reference being had therein to the accompanying drawings.

My invention relates to improvements in that class of machines which are adapted to the planting of corn and other grain and seeds, either in drills or continuous rows or hills, as may be desired; and the objects of my improvements are, first, to provide a machine which, when the seeds are to be deposited in check-rows or in hills, may be so operated by the foot of the person in attendance as to leave the hills any desired distance apart without reference to the speed at which the machine is driven forward; second, to provide a novel method of driving the seed-dropping wheels; third, to provide a novel combination of devices for changing the machine from one which deposits the seeds in hills to one which will deposit the corn or other seeds in drills or in continuous rows; fourth, to provide novel combinations of parts for making the different parts of the machine operative, as will be more fully described hereinafter. I attain these objects by the mechanism and its combinations illustrated in the accompanying drawings, in which—

Figure 1 is a top or plan view, showing the frame, the seed-hoppers in plan and in sections, the carrying-wheels, the axle, one of the seed-wheels, the adjustable marker, the mechanism for changing the dropping mechanism from a drill-row to one for dropping in hills, a lever and shaft for opening and closing the seed-outlet apertures, the driver's seat, and a portion of the tongue. Fig. 2 is a sectional elevation on line 2 2, showing the furrow-opener, mechanism for conveying the grain or seeds, a pivoted frame for carrying it, a wheel for compressing the earth upon the seeds after they have been covered, and the dropping mechanism. Fig. 3 is a sectional elevation of the device which controls the position of the rear end of the frame, which carries the tamping-wheel and the seed-coverer. Fig. 4 is a bottom view of the machine, showing the frame, the carrying-wheels, the coverers which succeed the dropping-wheels, the frame which carries the seed-coverers, and the tamping-roller, the tongue, and the oscillating or partially-rotating plate which controls the dropping of the seed. Fig. 5 is a sectional elevation on line 5 5 of Fig. 1, showing one of the seed-hoppers and the construction of the seed-wheels. Fig. 6 is an elevation of a portion of one of the carrying-wheels and of one of the seed-dropping wheels; and Fig. 7 is an elevation of the marker, showing the mechanism for operating it and the method of holding it in position.

Similar letters refer to similar parts throughout the several views.

It has been customary heretofore to construct machines for planting corn and other grains or seed and so arranging the parts thereof that they could deposit such seeds in the earth in check-rows, or in drills or continuous rows, at the option of the operator; but in all such machines with which I am acquainted the distance between the hills has been regulated by the mechanism as previously arranged for that purpose. My machine differs from all such in that the distances between the hills are controlled by the operator, the parts being so arranged that the dropping mechanism is operated by his foot, thus leaving his hands at liberty to be used in guiding the team and in manipulating the other parts of the device. It also differs from all others with which I am acquainted in the construction and combination of its parts.

In constructing machines of this type I provide a frame, A, of wood or of metal, of substantially the form shown in Figs. 1 and 4, or of any other that will adapt it for the reception and support of the other parts of the machine. To the frame A there is secured an axle, A', which is held in position by staples A², or in any other suitable manner. Upon the ends of the axle there are placed carrying-wheels A³ A⁴, which rotate freely on said axle. Upon the axle, at a point inside the carrying-wheels, there are placed seed-dropping wheels B B', the outer ends of which are provided with recesses, into which the spokes of the carrying-wheels A³ and A⁴ enter, by which means the seed-dropping wheels are made to rotate with said carrying-wheels. The inner portions of the seed-wheels are inclosed within stationary casings $B^2$ $B^3$, in which there is formed a slot, $B^4$, for the passage of the corn or other seeds from hoppers $B^5$ and $B^6$, with which they communicate, and said casings are also provided upon their lowest portions with an opening, $B^7$, through which the seed falls of its own gravity as it passes into the furrow formed for its reception. That portion of the seed-wheels which is within the casings above alluded to, is provided with a series of hinged seed-cells, $B^8$, as shown in Fig. 5, into which the corn or other seeds pass from the hopper as they pass the slots $B^4$ in the casing. These hinged cells are provided with springs $B^9$, which keep their free ends pressed out against the interior surface of the casing in which they move, and thus prevent more than the required number of kernels or of seeds from entering each cell, and at the same time prevent the kernels or seeds from being broken by coming in contact with the casing.

In making provision for dropping the corn or other grain or seeds in hills, there is provided and placed upon the shaft $A'$ two disks of metal, $C$ $C'$, which are free to partially rotate upon said shaft. These disks are united by suitable rods or strips of metal, or by both, and carry upon their lower portions a sliding seed-controlling plate, $C^2$, of metal, which has upon its ends extended portions $C^3$, each one of which is provided with an aperture, $C^4$, which, when said aperture is made to register with the aperture $B^7$ in the casing, will allow the seeds to fall out and be properly distributed; but when not thus registering will stop the dropping of the seeds entirely. The motion required to plant corn or other seeds in hills is imparted to the plates just described by the foot of the operator, who, as he sits upon the seat D, places one or both of his feet upon the rods which unite the disks and presses forward thereon, the effect of which is to move the seed-controlling plate $C^2$ into such a position as to cause the apertures in its ends to register with those in the casings, when the seeds will be dropped, as before stated. When this has been done the foot of the operator, or the pressure thereof, is removed from the rods and a spring, $D'$, arranged as shown in Fig. 2, or in any other suitable manner, returns said plate $C^2$ to such a position as to prevent the further discharge of the seed until the operator again presses upon the rods to cause another movement of the plate.

From the above description, and upon reference to the drawings, it will be seen that the above-described construction of the parts enables the operator to locate the hills at any distance apart that he may choose without reference to the speed at which the machine is being drawn forward.

The amount of movement imparted to the plate $C^2$ is controlled by a sliding rod, $D^2$, placed in projections formed upon the disks $C$ $C'$, one end of which, when the machine is arranged for planting in hills, comes in contact with a stop, $D^3$, arranged for that purpose.

For the purpose of enabling the operator to plant in drills or in continuous rows the rod $D^2$ is moved endwise, so as to cause its opposite end to project beyond its disk, so that as the lever E is moved into the position shown in dotted lines in Fig. 2 it shall be brought into contact with the projecting end of the rod, and thus cause the seed-controlling plate $C^2$ to be brought into such a position as to cause the seeds to be dropped continuously, the plate at such times being held in its adjusted position by the sliding dog $E'$, (shown in Fig. 2,) the dotted lines showing it in its locking position and the full lines in its unlocked one, its inner end, as shown, when in position to hold the plate $C^2$ in its open position, coming in contact with one of the wires which pass through the disks $C$ $C'$. In practice the parts remain in the last-named position so long as it is desirable to plant the seeds in drills; but when it becomes necessary to plant in hills the sliding dog $E'$ is moved into the position shown in full lines in Fig. 2 and the rod $D^2$ is returned to its original position.

For the purpose of forming a small furrow or drill for the reception of the grain there is provided a shaft, F, which is carried in lugs $F'$, attached to the frame A, its outer ends being bent downward or supplied with arms, upon the lower ends of which shovels or furrow-openers $F^2$ $F^3$ are secured. To the shaft F the lever E, above alluded to, is secured, and by it the shovels or furrow-openers are raised or lowered, so as to cause them to enter the earth, or to pass over it, as desired. Through each one of the arms of the shaft F there is passed a pin, $F^4$, for a purpose soon to be described.

In providing for covering the corn or seeds after they have been dropped into the furrow, there is pivoted to the forward end of frame A, or to lugs attached thereto, upon each side of the machine, a swinging frame, G, which by preference is composed of two bars of metal held the proper distance apart by blocks of wood or metal placed between them, their construction being clearly shown in Fig. 4 of the drawings. They may, however, be made of a single bar and have their ends slotted, so as to leave a space for the reception of the arms and the tamping-wheels to work in. The rear ends of these swinging frames are attached to the main frame by means of adjustable yokes or staples $G'$ $G'$, one leg of which is provided with a spring, $G^2$, which is placed between the upper surface of the frame G and the under surface of frame A, their office being to give a downward pressure upon the rear ends of the frame G, and through them upon the earth, compacting or tamping wheels or rollers $G^3$, which are journaled in the sides of the frame, as shown in Fig. 2, and serve to compact the earth upon and around the seeds in the furrow, they being arranged at such distances apart as to pass directly over the furrow formed by the furrow-openers F² and F³.

For the purpose of covering the seeds after they have been deposited in the furrow, and before they are passed over by the compacting or tamping wheels, there is pivoted to each of the swinging frames G G coverers G⁴ G⁴, which have rearwardly-extending portions passing downward upon each side of the swinging frames, the spaces between their two parts being greatest at their forward ends, in order that as they are pressed downward the earth entering between them shall be concentrated in a ridge above the seeds, and thus be left in the proper condition and position to be compacted upon and around the seeds by the wheels G³ as they pass along. The ends of the plates composing the coverers that are above their pivoted parts extend upward sufficiently to admit of their having attached to them, by means of pins or bolts H, a yoke, H', which extends forward from its pivotal point far enough to pass around the arms of the shaft F and rest upon the upper surface of the swinging frames G G. The arrangement of the yoke with reference to the coverers and to the lever E is such that as the upper end of said lever is carried rearwards, as shown in dotted lines in Fig. 2, the arms of the shaft upon which it is placed will come in contact with the outer end, which will raise the rear ends of the coverers free from the ground; but when said lever is brought into the position shown in full lines the pins F⁴, which pass through the arms that carry the shovels or furrow-openers, come in contact with the upper surface of the yoke H', and so press the coverers down into the earth and the compacting or tamping wheels thereon.

In constructing machines with my improvements applied thereto I place the seed-wheels and the swinging frames, with these coverers, at such a distance from each other as to leave between them a space equal to that required to be left between the rows or hills of the crop the seeds of which are to be planted, and in order that such distance may be left between all of the rows, or that a greater or less one may be left between some of the rows than between the others, I attach to the forward end of the frame of the machine a marker which is capable of being used for marking the position of the succeeding row as the machine is drawn forward, and upon either side thereof.

In applying this device I attach to the forward end of the frame a plate of metal, I, in which there is formed a groove or recess; or its outer edge may be turned upward, so as to cause it and the surface of the frame to form said groove or recess, in which there is placed a bar of metal, which slides freely therein, said bar being designated by I'. To the under side of the bar, springs I² I² are secured in such a manner as to cause their under surfaces to bear against the plate I, in doing which they press the bar I' upward and cause pins I³, which are secured to a ring of metal, I⁴, to enter recesses formed in the upper surface of bar I', and thus hold it in its adjusted position. The outer ends of this bar are bent downward, as shown in Fig. 7, the downwardly-projecting portions being of the requisite length to allow them to enter the earth far enough to leave a distinct mark as the machine is drawn forward, which will indicate the position of the succeeding row.

In order that the operator may be enabled to adjust the marker while sitting in his seat, there is attached to the bar I' a handle, I⁵, which is so far inclined toward said seat as to bring it within reach of the person in attendance while sitting thereon. When it becomes desirable to change the position of the marker the operator takes hold of the handle and presses down upon it, which causes the springs to yield to such an extent as to allow the bar carrying the marker to be moved laterally to any desired extent, which may be far enough to leave the succeeding row at the same distance from the one next to it as that which intervenes between the two rows formed by the machine; or it may be so adjusted as to leave a greater or less distance, should occasion require it to be done.

Having thus described my invention, what I claim, and desire to secure by Letters Patent, is—

1. The herein-described mechanism for dropping corn in drills or continuous rows or in hills, it consisting of partially-rotating wheels or disks C C', placed upon the shaft of a corn or seed planter, and carrying a plate, C², which covers and uncovers the cells of the dropping-wheels, the parts being arranged substantially as described, whereby they are made capable of being manipulated by the foot of the operator for the purpose of enabling him to place the hills at a greater or less distance apart, as set forth.

2. The combination of the laterally-adjustable marking-bar I', plate I, springs I² I², pins I³ I³, ring I⁴, and inclined handle I⁵, the whole constituting a row-marker, as set forth.

3. The herein-described seed-dropping wheels B B', they consisting of metal cylinders, having in the peripheries hinged seed-cells operated by springs, and upon their outer ends a series of recesses for the reception of the spokes of the carrying-wheels from which they receive their motion, substantially in the manner described.

4. The combination of the partially-rotating device to be operated by the foot or feet of the person in attendance, consisting of the disks C C' and suitable connecting-rods and springs for returning the devices to their proper positions after they have been moved for dropping the seeds, and the locking-slide E', the parts being constructed and arranged to operate substantially as described, whereby they are made capable of changing the machine from one which drops seeds in hills to one which deposits them in drills or continuous rows.

5. The combination of the disks C C', of the partially-rotating disks, sliding rod $D^2$, and controlling-plate $C^2$, the movements of which are controlled by said rod, substantially as and for the purpose specified.

6. In combination with the carrying-wheels of a corn or seed-planter, the recessed dropping-wheels having in them hinged cells operated by springs for regulating the quantity of seed dropped, and which receive their motion from the spokes of the carrying-wheels, and the stationary casing $B^2$, in which said dropping-wheels revolve, substantially as set forth.

7. The combination of the lever E, adjustably-sliding rod $D^2$, sliding plate $C^2$, and the dropping-wheel B', the arrangement of the parts being substantially as shown, and for the purpose set forth.

8. In combination with the main frame of a corn-planter, the pivoted frame G, seed-coverers $G^4$, pivoted to the frame G, springs $G^2$, for controlling the distance that the rear end of the frame G shall be allowed to rise, and tamping-wheels $G^3$, substantially as set forth.

9. The combination of the lever E, the yoke H', the pivoted coverer $G^4$, pivoted to the frame G, and said frame G having its front end pivoted to the main frame of the machine and its rear end controlled by a spring, the arrangement of the parts being substantially as described, and for the purpose set forth.

In testimony whereof I affix my signature in presence of two witnesses.

ALVIN B. CLARK.

Witnesses:
ARTHUR A. CURINE,
JOHN HOWARTH.